United States Patent [19]

Sagoi et al.

[11] Patent Number: 4,801,481
[45] Date of Patent: Jan. 31, 1989

[54] PERPENDICULAR MAGNETIC RECORDING FLOPPY DISK

[75] Inventors: Masayuki Sagoi; Reiji Nishikawa, both of Yokohama, Japan

[73] Assignee: Tokyo Shibaura Denki Kabushiki Kaisha, Kawasaki, Japan

[21] Appl. No.: 505,480

[22] Filed: Jun. 17, 1983

[30] Foreign Application Priority Data

Jun. 25, 1982 [JP] Japan ................................ 57-109528

[51] Int. Cl.$^4$ .............................................. B32B 3/02
[52] U.S. Cl. .................................... 428/64; 204/192.2; 428/213; 428/458; 428/480; 428/694; 428/900
[58] Field of Search ............... 428/928, 213, 900, 458, 428/64, 480, 694; 427/128, 131, 132; 204/192 M, 192.2

[56] References Cited

U.S. PATENT DOCUMENTS

| 3,725,611 | 4/1973 | Smaller ........................ 179/100.2 A |
| 4,343,834 | 8/1982 | Saito et al. ........................... 427/132 |
| 4,423,454 | 12/1983 | Felleisen et al. ..................... 360/135 |

FOREIGN PATENT DOCUMENTS 0054269 6/1982 European Pat. Off. .
1530911 11/1978 United Kingdom .

OTHER PUBLICATIONS

Patent Abstracts of Japan vol. 6, No. 59, 16 Apr. 1982 & JP-A-56-169220.
Patent Abstracts of Japan vol. 6, No. 162, 25 Aug. 1982 & JP-A-57-78627.
Patent Abstracts of Japan vol. 5, No. 60; 23 Apr. 1981 & JP-A-56-11622.
Patent Abstracts of Japan vol. 6, No. 84; 22 May 1982 & JP-A-57-20921.
Patent Abstracts of Japan vol. 6, No. 88; 26 May 1982 & JP-A-57-24022.
Patent Abstracts of Japan vol. 5 No. 115; 24 Jul. 1981 & JP-A-56-54635.
Digests of the 5th Annual Conference on Magnetics in Japan 1981, P. 77 "Curling of Metal Evaporated Thin Film Tape", by T. Fujita et al.
Patent Abstracts of Japan vol. 5 No. 64; 30 Apr. 1981 & JP-A-56-16939.

*Primary Examiner*—Bernard Pianalto
*Attorney, Agent, or Firm*—Oblon, Fisher, Spivak, McClelland, & Maier

[57] ABSTRACT

A perpendicular magnetic recording floppy disk comprises a flexible plastic film substrate, a first magnetic recording layer formed on one side of the plastic film substrate and having an axis of easy magnetization in a direction perpendicular to the one side of the plastic film substrate, and a second magnetic recording layer formed on the other side of the plastic film substrate and having an axis of easy magnetization in a direction perpendicular to the above-mentioned other side of the plastic film substrate. The second magnetic recording layer has a thickness greater than a thickness of the first magnetic recording layer.

3 Claims, 3 Drawing Sheets

FIG. 1
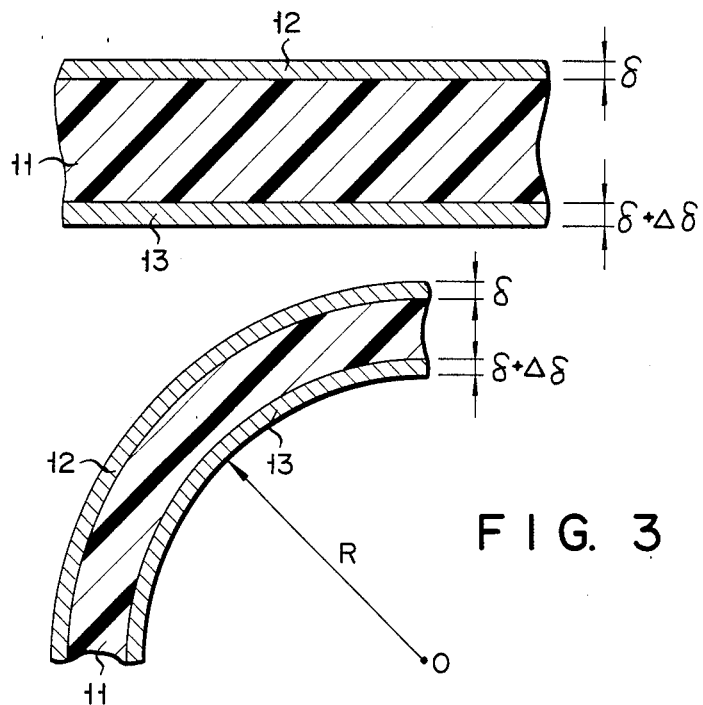
FIG. 3
FIG. 4
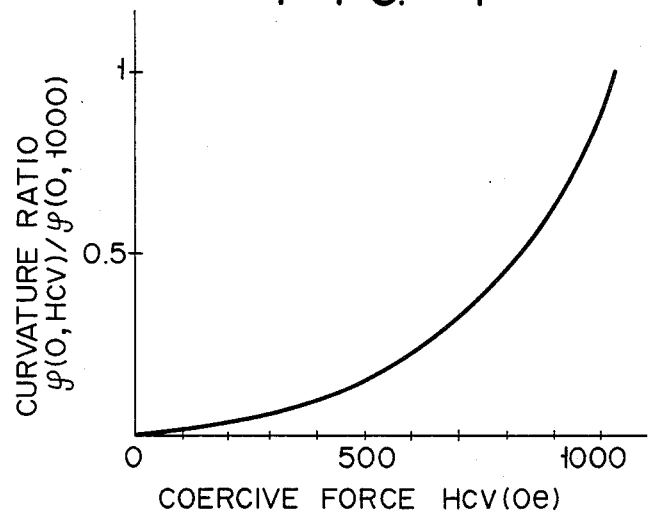

PERPENDICULAR MAGNETIC RECORDING FLOPPY DISK

BACKGROUND OF THE INVENTION

1. Field of the Invention

This invention relates to a perpendicular magnetic recording floppy disk.

2. Description of the Prior Art

A perpendicular magnetic recording system is now being developed, in which magnetization perpendicular to the surface of a magnetic recording medium is utilized to attain high-density recording. In the perpendicular magnetic recording system, an increase in recording density permits a decrease in the demagnetizing field, making it easy to increase the recording density. The magnetic recording medium of this type is formed by sputtering a Co-Cr-based magnetic material on a substrate such that the axis of easy magnetization is in a direction perpendicular to a recording surface. A magnetic tape and floppy disk are known which are manufactured by forming a Co-Cr-based thin layer on a plastic film substrate made of, for example, polyimide or polyester.

When the Co-Cr-based thin layer is formed, by sputtering, on one surface of the plastic film substrate of this type, a very large curl occurs in the thin film substrate with the thin-layer-deposited side of the film substrate curled to the outside. The extent of the curl depends upon the substrate temperature during deposition. That is, if the substrate temperature is lowered, the curl of the substrate can be suppressed to a corresponding extent. A perpendicular coercive force Hcv also has a close relation to the substrate temperature. That is, if a Co-Cr-based thin layer is formed at a lower substrate temperature, the coercive force Hcv is markedly lowered. From this it can be appreciated that there exists a trade-off between the curl of the film substrate and the coercive force Hcv with respect to the substrate temperature. In order to solve such a trade-off, a Co-Cr-based thin layer with the same thickness is formed on both the side of the plastic film substrate, so that a curl produced on one side of the film substrate is cancelled to a certain extent by a curl produced on the other side of the film substrate. The inventors have found by experiments that the curl of the substrate cannot be effectively cancelled by merely forming a Co-Cr-based thin layer with the same thickness on both the sides of the substrate. That is, the mere formation of such a Co-Cr-based thin layer on both the sides of the substrate could not provide a complete flatness to the plastic film substrate. Unless a high degree of flatness is attained, a very great problem is presented in the high-density signal recording. A slight curl of the substrate causes a decrease in the reproduction output and a degradation in the envelope of an output signal, thus preventing high-density signal recording. In the manufacture of floppy disks, the greatest task is to eliminate the curl of the substrate.

A method for minimizing the curl in a Co-Ni-alloy-evaporated thin film tape is disclosed in T. Fujita et al. "Curling of Metal Evaporated Thin Film Tape", Digests of the 5th Annual Conference on Magnetics in Japan, 1981, p. 77. According to this method, Al or Co-Ni alloy is back-coated on the thin film tape. This method, however, is different from the method of this invention in process and effects.

SUMMARY OF THE INVENTION

One object of this invention is to provide a highutility floppy disk having a high coercive force fitted for perpendicular magnetic recording and reproduction and a high degree of flatness.

Another object of this invention is to provide a method for the manufacture of the above-mentioned floppy disc.

According to this invention there is provided a floppy disk comprising a flexible plastic film substrate, a first magnetic recording layer formed on one side of the plastic film substrate and having an axis of easy magnetization in a direction perpendicular to the one side of the plastic film substrate, and a second magnetic recording layer formed on the other side of the plastic film substrate and having the axis of easy magnetization in a direction perpendicular to the above-mentioned other side, in which the thickness of the second magnetic recording layer is greater than that of the first magnetic recording layer.

If, in particular, the first and second Co-Cr-based magnetic recording layers are deposited by sputtering on both the surfaces, respectively, of the plastic film substrate and the second magnetic recording layer has a thickness 2 to 10% greater than that of the first magnetic recording layer, a greater effect is obtained.

The curl of the film substrate produced due to the formation of the first magnetic recording layer can be substantially cancelled by the curl produced due to the formation of the second magnetic recording film, thereby imparting a high degree flatness to the magnetic recording medium. Since, according to this invention, the temperature of the plastic film substrate can be kept as high as possible, but within a range in which the substrate suffers no heat damage, it is possible to form magnetic recording layer with a sufficiently high coercive force. Using the floppy disk of this invention, a spacing between the magnetic head and the disk surface can be made smaller and uniform. Furthermore, a high-density perpendicular magnetization recording can be performed through the utilization of the medium with the high coercive force. The floppy disk of this invention is simple in construction and easier to manufacture and has greater utility.

This invention also provides a method of manufacturing a floppy disk comprising the steps of forming a first magnetic recording layer by sputtering a perpendicularly magnetizable material on one side of a flexible plastic film substrate and forming a second magnetic recording layer by sputtering the perpendicularly magnetizable material on the other side of the plastic film substrate. During the formation of the first and second magnetic recording layers, the substrate temperature is kept as high as possible, but within a range in which the substrate is not damaged.

BRIEF DESCRIPTION OF THE DRAWINGS

Other objects and advantage will be apparent from the following description taken in conjunction with the accompanying drawings in which:

FIG. 1 is a cross-sectional view showing a floppy disk according to one embodiment of this invention;

FIG. 3 shows the curled state of the floppy disk;

FIG. 4 shows the relation between the curvature ratio $\phi(0, Hcv)/\phi(0, 1000)$ of the floppy disk and the coercive force Hcv of magnetic layers;

DETAILED DESCRIPTION OF THE PREFERRED EMBODIMENTS

Figure 2:
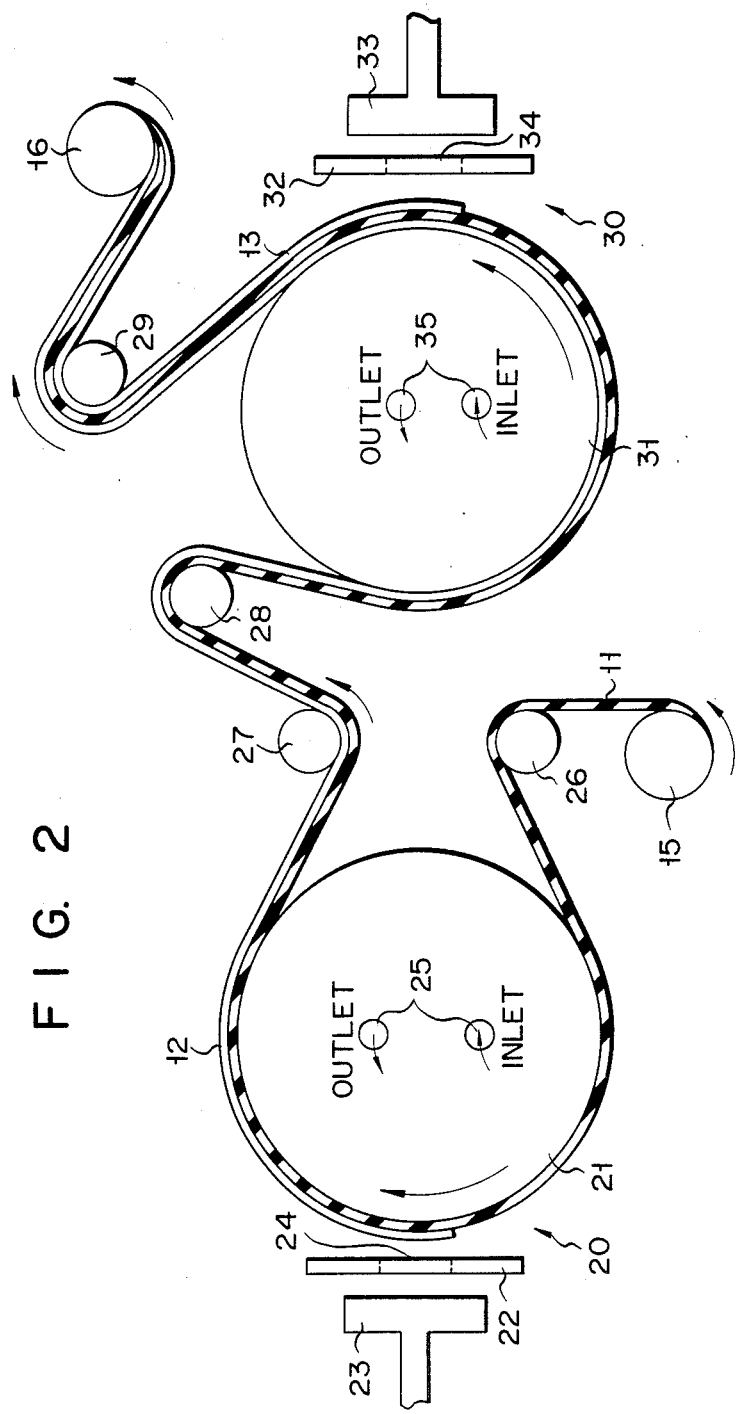
FIG. 2 is a diagrammatic view showing a method for manufacturing the floppy disk in FIG. 1.

A floppy disk according to one embodiment of this invention will be explained below by referring to FIG. 1.

A first magnetic recording layer 12 of a thickness $\delta$ is formed on one side of a film substrate 11 made of a flexible plastic material such as polyimide or polyester. A second magnetic recording layer 13 of a thickness $\delta+\Delta$ is formed on the other side of the film substrate 11. The first and second magnetic recording layers 12, 13 are formed by sputtering a Co-Cr-based thin layer on the film substrate 11. The thickness $\delta$ of the first magnetic recording layer 12 is usually 0.5 to 1.0$\mu$ and the second magnetic recording layer 13 is formed to have a thickness 2 to 10% greater than that of the first magnetic recording layer 12.

FIG. 2 shows a method of the manufacture of the floppy disk according to this invention.

A 50-$\mu$ thick×50-cm wide polyester film substrate 11, for example, which is supplied from a supply roller 15 through a guide roller 26 is fed to a first deposition station 20 where a first magnetic recording layer 12 with a thickness $\delta$ made of a Co-Cr-based alloy is deposited on one side of the substrate. The first deposition station 20 comprises a drum-like substrate holder 21, shielding mask 22 and Co-Cr target 23. The Co-Cr-based alloy sputtered from the Co-Cr target 23 is passed through an opening 24 of the shielding mask 22 and deposited on one side of the film substrate 11 to form a first magnetic recording layer 12 of the thickness $\delta$. When the magnetic layer is to be formed by sputtering, a greater power is applied to the target 23 and thus greater energy is applied to the deposited Co-Cr-based layer. That is, the energy is transferred to the film substrate 11 when the Co-Cr-based alloy vapor is deposited on the film substrate 11. In order for the film substrate 11 not to be subject to a very high temperature and thus to heat damage due to such an energy transfer, the substrate holder 21 is cooled by a cooling medium flowing through a pipe 25 provided in the substrate holder 21. In this way, the film substrate 11 is cooled. The temperature of the film substrate 11 is maintained as high as possible, but within a range in which the film substrate 11 is not subject to heat damage. By so doing, it is possible to obtain a magnetic medium with high coercive force Hcv.

The film substrate 11 with the first magnetic recording layer 12 is supplied through guide rollers 27 and 28 to a second deposition station 30. The second deposition station 30 comprises a drum-like substrate holder 31, shielding mask 32 and Co-Cr target 33. A Co-Cr-alloy vapor from the Co-Cr target 33 passed througth the opening 34 of the shielding mask 32 and is deposited on the other side of the film substrate 11 to form a second magnetic recording layer 13 with the thickness $\delta+\Delta\delta$. The substrate holder 31 is, like the holder 21, cooled by a cooling medium flowing through a pipe 35 provided in the substrate holder 31. The temperature of the film substrate 11 is kept as high as possible, but within a range in which the film substrate 11 suffers no heat damage. The magnetic film with Co-Cr layers on both the sides, formed in above procedure, is wound around a take-up roller 16 through a guide roller 29.

The inventors have found by experiment that, if the first and second magnetic recording layers 12 and 13 are formed to have the same thickness, the first magnetic recording layer side is outwardly curled or projected with the second magnetic recording layer side curled inwardly. It has also been found by continued experimentation that the amount of curl of the substrate depends upon the magnitude of the coercive force in the magnetic recording layer and upon a thickness increment $\Delta\delta$ of the second magnetic recording layer 13 with respect to that of the first magnetic recording layer 13.

If the increment $\Delta\delta$ is sufficiently small, the magnetic recording medium is curled as shown in FIG. 3. The amount of curl can be represented by a curvature $\phi$.

$$\phi = 1/R$$

Since it has been found that the curvature $\phi$ depends upon a corrected amount of layer thickness, $\Delta\delta/\delta$, and coercive force Hcv, the curvature $\phi$ can be expressed as follows:

$$\phi = \phi(\Delta\delta/\delta, Hcv)$$

Figure 5:
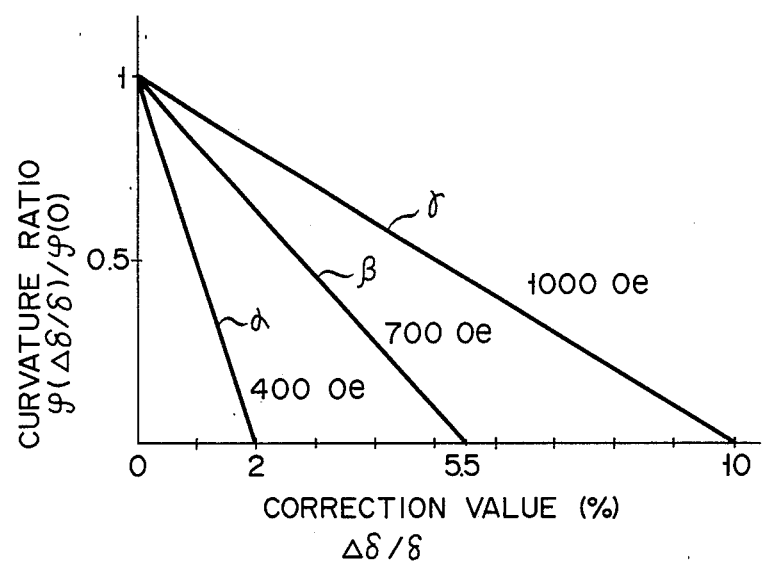
FIG. 5 shows the relation between the curvature ratio $\phi(\Delta\delta/\delta)/\phi(0)$ and a correct value of layer thickness.

FIG. 4 shows the results on the measured amount of curl vs. coercive force Hcv when no layer thickness correction is made, i.e., $\Delta\delta=0$. It has been found that the amount of curl (curvature) $\phi(0, Hcv)/\phi(0, 1000)$ is increased with an increase in coercive force Hcv. From FIG. 4 it will be seen that, if a floppy disk having a coercive force of below 300 Oe is to be obtained, the amount of curl can be disregarded. It is, therefore, not necessary to correct the layer thickness. In order to perform high-density signal recording fit for the above-mentioned perpendicular magnetization recording, it is necessary to obtain a high coercive force Hcv of the order of, normally, 400 to 1000 Oe. In this case, it is only necessary to make the thickness of the second magnetic recording layer 13 greater than that of the first magnetic recording layer. FIG. 5 shows the relationship between the amount of curl, $\phi(\Delta\delta/\delta)/\Delta(0)$ and the correct amount of layer thickness, $\Delta\delta/\Delta$, as found within such a high coercive force range. In FIG. 5, the curves $\alpha$, $\beta$ and $\gamma$ show a variation of $\phi(\Delta\delta/\delta)/\delta(0)$ with $\Delta\delta/\delta$ change when the coercive force Hcv is 400, 700 and 1000 Oe, respectively. When the coercive force Hcv is within a range of 400 to 1000 Oe, the amount of curl of the magnetic medium can be made zero if the thickness of the second magnetic recording layer is increased by 2 to 10% as compared with that of the first magnetic recording layer. As a result, it is possible to obtain a floppy disk with a high degree of flatness.

According to this invention, a curl of the magnetic recording medium can be effectively cancelled by making the thickness of the second magnetic recording layer 13 about 2 to 10% greater than that of the first magnetic recording layer 12. Thus, the flatness of the magnetic recording medium can be improved. Since a trade-off between the curl of the magnetic recording medium and the coercive force can be solved, the first and seond magnetic recording layers 12 and 13 can be formed at as high a temperature level as possible, but within a range in which the film substrate 11 is not subjected to heat damage. It is, therefore, possible to obtain the magnetic medium with an adequately high coercive force Hcv. By using the floppy disk of this invention, the spacing between the magnetic head and the floppy disk surface can be made smaller, permitting high-density perpendicular magnetic recording and reproduction to be performed with excellent recording and reproduction characteristics. The thickness of the first and second magnetic recording layers 12, 13 can be readily and stably formed by controlling, for example, the sputtering time of the Co-Cr-based alloy.

A perpendicular magnetic recording floppy disk according to another embodiment in this invention will be explained below in reference to FIG. 6.

Figure 6:
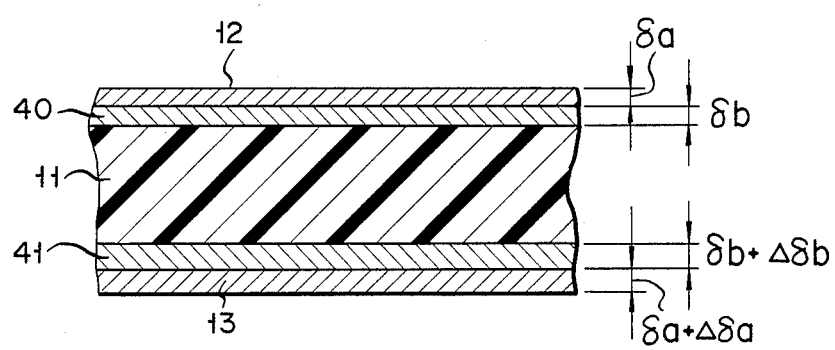
FIG. 6 is a cross-sectional view showing a floppy disk according to another embodiment of this invention.

In this embodiment, as shown in FIG. 6, first and second soft magnetic layers 40 and 41 made of Fe-Ni alloy or pure Fe are formed, the first soft magnetic layer being between a first magnetic recording layer 2 and a film substrate 11 and the second soft magnetic layer between a second magnetic recording layer 13 and the film substrate 11. The first and second magnetic recording layers 12 and 13 have thicknesses of $\delta a$ and $\delta a + \Delta \delta a$, respectively, and the first and second soft magnetic layers, 40 and 41 have a thickness of $\delta b$ and $\delta b + \Delta \delta b$, respectively. In this case, a curl-free floppy disk can be manufactured by making the thickness of the magnetic layers formed on a second surface (i.e., the other surface) of the film substrate 11 greater than that of the magnetic layers formed on a first surface (i.e., one surface) of the film substrate 11, in the same way as mentioned above.

What we claim is:

1. A perpendicular magnetic recording floppy disk comprising:

a flexible plastic film substrate;

a first magnetic recording layer formed on one side of the plastic film substrate and having an axis of easy magnetization in a direction perpendicular to the one side of the plastic film substrates; and a second magnetic recording layer formed on the other side of the plastic film substrate and having an axis of easy mangetization in a direction perpendicular to said other side of the plastic film substrate said second magnetic recording layer being made of the same magnetic material as that of said first magnetic recording layer the thickness of the second magnetic recording layer being greater than that of the first magnetic recording layer, in which said first and second magnetic recording layers each have a coercive force of about 400 to 1,000 oersteds and second magnetic recording layer has a thickness 2 to 10% greater than that of said first magnetic recording layer.

2. A perpendicular magnetic recording floppy disk according to claim 1, in which said first and second magnetic recording layers each are a Co-Cr-based thin layer formed by sputtering on the plastic film substrate.

3. A perpendicular magnetic recording floppy disk according to claim 2, in which said plastic film substrate is made of polyester.

* * * * *